United States Patent [19]
Rozenblatt et al.

[11] Patent Number: 4,783,859
[45] Date of Patent: Nov. 15, 1988

[54] AIRCRAFT TOILET FLUSH VALVE

[75] Inventors: Mike M. Rozenblatt, Manhatten Beach; Jon E. Allen, Torrance; Anna M. Jung, Redondo Beach, all of Calif.

[73] Assignee: Monogram Industries, Inc., Culver City, Calif.

[21] Appl. No.: 119,203

[22] Filed: Nov. 4, 1987

Related U.S. Application Data

[63] Continuation of Ser. No. 779,661, Sep. 24, 1985, abandoned.

[51] Int. Cl.$^4$ ............................................. B64D 11/02
[52] U.S. Cl. ...................................... 4/316; 4/321; 4/434; 4/DIG. 13; 251/129.12; 251/9; 251/80
[58] Field of Search .................... 4/316, 321, 323, 431, 4/432, 433, 434, 435, DIG. 13, DIG. 17, DIG. 16; 251/129.12, 9, 4, 80, 77

[56] References Cited

U.S. PATENT DOCUMENTS

| | | |
|---|---|---|
| 187,545 | 2/1877 | McEwan ................................. 4/434 |
| 828,547 | 8/1906 | Hayden ........................... 251/129.12 |
| 916,831 | 3/1909 | Bettinger ......................... 251/129.12 |
| 2,810,991 | 10/1957 | Mead et al. . |
| 3,278,153 | 6/1963 | Dallas . |
| 3,321,172 | 5/1967 | Buss . |
| 3,482,267 | 12/1969 | Liljendahl . |
| 3,520,332 | 3/1968 | Willard ........................... 251/129.12 |
| 3,554,483 | 1/1971 | Kuwik . |
| 3,578,885 | 5/1971 | Alton . |
| 3,984,080 | 10/1976 | Varis et al. . |
| 4,145,026 | 3/1979 | Chronister ............................ 251/80 |
| 4,275,470 | 6/1981 | Badger et al. ......................... 4/316 |
| 4,357,719 | 11/1982 | Badger et al. . |
| 4,376,314 | 3/1983 | Iwans . |
| 4,376,315 | 3/1983 | Badger et al. . |
| 4,713,847 | 12/1987 | Oldfelt et al. ......................... 4/434 |

FOREIGN PATENT DOCUMENTS

| | | |
|---|---|---|
| 2182354 | 7/1973 | France . |
| 335450 | 9/1930 | United Kingdom . |
| 1317359 | 5/1973 | United Kingdom . |

Primary Examiner—Henry J. Recla
Assistant Examiner—Linda J. Sholl
Attorney, Agent, or Firm—Pretty, Schroeder, Brueggemann & Clark

[57] ABSTRACT

A flush valve is provided for opening and closing a drain connecting a toilet bowl to a waste holding tank maintained at a partial vacuum. The flush valve is located external to the drain and comprises a pinch or nip mechanism surrounding a flexible section of the drain and an electro-mechanically operated actuator for moving the pinch mechanism to close the drain by pinching it shut or to open the drain by pulling it apart. The actuator includes a motor for moving a piston in opposite directions, and a cylinder having one end connected to the pinch mechanism and another end containing an enclosure. The piston is retained and reciprocable a limited distance within the enclosure, and a spring is interposed within the enclosure to provide biasing means between the piston and the cylinder. The spring has sufficient stiffness relative to the force needed to shut the flexible drain section, in the absence of an obstruction, so that the flexible drain section may be fully closed without compression of the spring by the piston. However, when the flexible drain section is nipped shut, or if an obstruction is encountered, the spring will be compressed within the enclosure by the piston, causing operation of a switch to deactivate the motor and prevent motor stalling and damage to the valve. A manually operable shut-off flush valve also is provided, comprising a plate slidable through a coupling in the drain line to bring an opening in the plate in or out of registration with the drain line to open or close it, respectively.

9 Claims, 3 Drawing Sheets

AIRCRAFT TOILET FLUSH VALVE

This application is a continuation of application Ser. No. 779,661 filed Sept. 24, 1985 now abandoned.

FIELD OF THE INVENTION

This invention relates generally to valves for opening and closing fluid communication lines and, particularly, to an aircraft toilet flush valve for opening and closing a drain connecting a toilet bowl to a waste holding tank under vacuum.

BACKGROUND OF THE INVENTION

For many years, aircraft toilet systems have utilized fluid recirculating toilets for disposing of waste. These systems generally comprise a toilet bowl mounted above or connected by a drain to a waste holding tank containing a charge of water. When the toilet is flushed, a pump connected to the tank pumps a volume of water from the tank and passes it through a spray apparatus in the bowl to wash the waste water back into the tank with the assistance of gravity. A filter associated with the pump separates the solid waste from the liquid waste in the tank to prevent clogging the pump and downstream rinse water lines.

In more recent years, vacuum flush systems have been used to forcefully withdraw the waste and rinse water from the bowl and through the drain into the holding tank. In such systems, the tank is situated below the passenger cabin floor and vented to the atmosphere outside the aircraft, and the toilet bowl is situated inside the pressurized passenger cabin and maintained at cabin pressure. At altitudes generally above 15,000 feet, the difference in pressure between the atmospheric pressure outside the aircraft and the cabin pressure inside the aircraft causes sufficient air flow from the bowl to the tank to remove the waste. At ground level and at altitudes generally below 15,000 feet, a vacuum pump may be used to artificially create a vacuum in the tank. Another approach involves eliminating the use of recirculated flush fluid by utilizing fresh rinse water from the potable water supply of the aircraft.

When vacuum flush systems are employed, it is necessary to keep the drain connecting the toilet bowl to the waste holding tank in a closed position, except for a relatively brief period when the toilet is engaged in a waste flushing cycle. If some means were not provided to close the drain and cut off vacuum to the bowl when the toilet is not in a flushing cycle, the cabin of the aircraft where the bowl is situated eventually would suffer an unacceptable reduction in cabin pressure. Moreover, particularly at ground level, the drain must be closed to prevent undesirable waste fumes in the waste holding tank from migrating through the drain and out of the bowl into the passenger cabin.

Several flush valves have been developed over the years for opening and closing the drain in vacuum flush systems. One relatively recent valve shown in U.S. Pat. No. 4,376,315, and presently used in the industry comprises a flexible diaphram mounted in a side opening of a vacuum drain line and surrounded by a control pressure chamber. To close the drain, cabin pressure enters the chamber to depress the diaphram against the drain to a normally closed position. To open the drain during a flushing cycle, vacuum from the waste holding tank and drain enters the chamber to pull the diaphram away from the drain into an open position.

A flush valve of the pressure operated, flexible diaphram type, may be subject to several disadvantages. For example, if sharp objects are dropped in the toilet bowl and the diaphram occupies a bend in the drain, the objects may hit the diaphram and possibly rupture it as they rapidly accelerate through the drain. This would disable the toilet and cause a reduction of cabin pressure. In use, flight attendants sometimes use coat hangers and the like to clear a clogged drain. If the diaphram is part of the bend in the drain line, it could be ruptured. Pressure operated, flexible diaphram type flush valves also have vacuum tubes and check valves associated with the drain and control pressure chamber that could become clogged by waste. Furthermore, servicing of the flush valve in the event of valve failure may be difficult without the physical handling of the waste that remains trapped in the bowl. Objects caught in the drain which prevent the diaphram from completely closing the drain also could present a problem.

Accordingly, there has existed a definite need for a flush valve for positively opening and closing a drain and which is easily serviceable and not susceptible to damage that could cause waste leakage or other undesirable effects in the system. The present invention satisfies this need and provides further related advantages.

SUMMARY OF THE INVENTION

The present invention provides a flush valve for positively opening and closing a drain line connecting a toilet bowl to a waste holding tank under vacuum. The flush valve is located external to the drain line and comprises a pinch knife assembly surrounding a flexible section of drain and an electro-mechanical drive mechanism for moving the pinch knife assembly to close the flexible drain section by pinching it or to temporarily open the flexible drain section by retracting away from it. If the flexible drain section is obstructed for some reason, a motor in the drive mechanism automatically is deactivated to prevent motor stall and possible damage to the motor and flush valve. The flush valve furthermore is reliable in operation, simple to maintain and relatively inexpensive to manufacture.

The pinch knife assembly included in the flush valve of this invention is well known in the art and comprises an upper pinch knife on one side of the flexible drain section and a lower pinch knife on an opposite side of the flexible drain section. The two pinch knives are connected together by a valve linkage partially surrounding the flexible drain section so that movement of one pinch knife towards or away from the flexible drain section also moves the other pinch knife in the same direction. The upper pinch knife is connected to the electro-mechanical drive mechanism for moving the pinch knives in unison through the linkage to the open and closed positions.

More specifically, the drive mechanism is connected to the upper pinch knife and comprises a cylinder having a lower end connected to the upper pinch knife and an upper end containing an open-ended enclosure, within which is positioned a spring and a piston. A lower end of the piston is retained within the enclosure of the cylinder and reciprocated a limited distance within the enclosure by a drive shaft attached to the motor and the piston's upper end. The spring is interposed between the lower end of the piston and the cylinder and functions to take up piston travel when the piston is moved downwardly against the cylinder to compress the pinch knives and pinch the flexible drain section closed. In the event that the flexible drain section is obstructed and cannot be fully closed, although movement of the cylinder will be stopped by the obstructed drain, the piston will go through its full range of travel, compressing the spring and actuating a switch for shutting off the motor. This feature for deactivating the motor when the flexible drain section is obstructed prevents stalling and premature failure of the motor, as well as possible damage to the flush valve.

In the event that the flush valve becomes inoperative for any reason, a manually operated shut-off valve is provided downstream of the flush valve for closing the drain line. The shut-off valve comprises a relatively thin, rectangular shaped plate having a circular opening substantially corresponding to the circular cross-section of the drain. Sliding movement of the plate into a coupling connecting the shut-off valve to the drain line, causes the opening in the plate to move into registration with the drain line to open it, while movement of the plate out of the coupling moves the opening out of registration with the drain line to close it. A pair of gaskets are provided in the coupling for frictional engagement against the plate in both the open and closed positions to prevent waste leakage or loss of vacuum.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
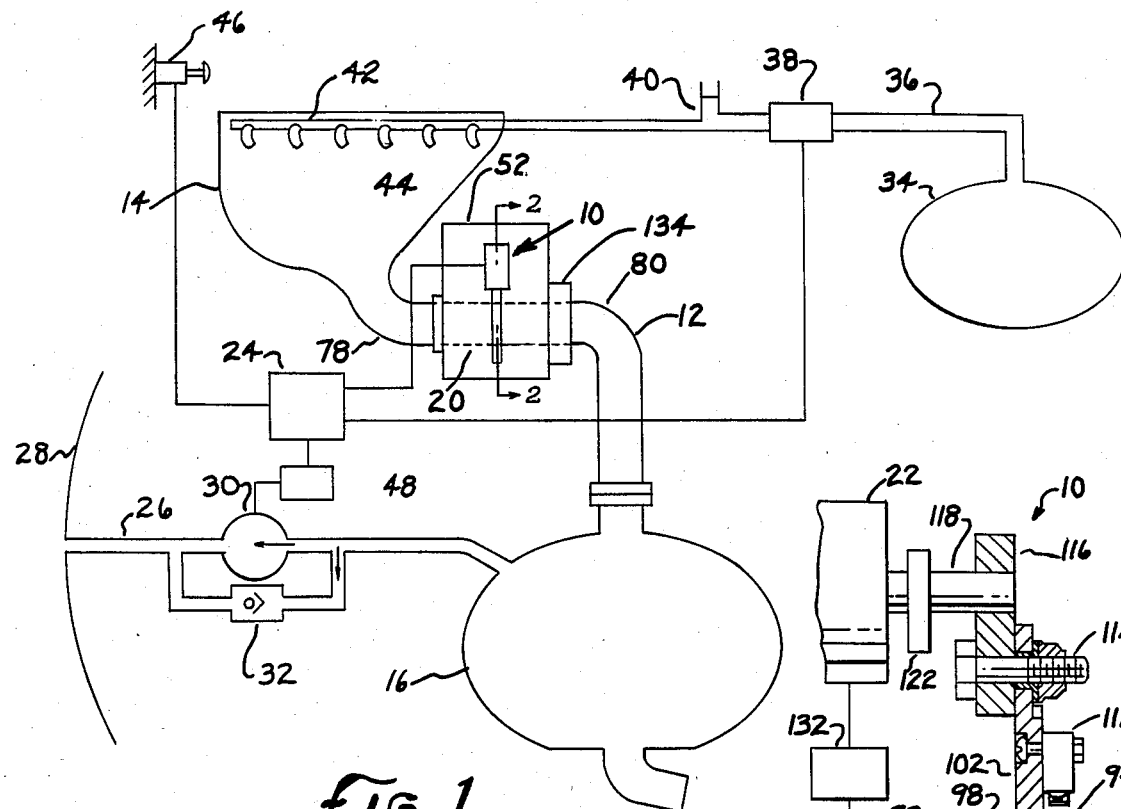
FIG. 1 is a schematic view of an aircraft toilet flush valve embodying the novel features of the invention and illustrated in association with a drain line connecting a toilet bowl to a waste holding tank under vacuum.

As shown in the exemplary drawings, the present invention is embodied in an aircraft toilet flush valve, referred to generally by the reference numeral 10, for use in opening and closing a drain line 12 connecting a toilet bowl 14 to a waste holding tank 16 under vacuum. The flush valve 10 is provided with a drive mechanism 18 for moving a pinch mechanism to positively open and close a flexible section 20 of the drain line to allow vacuum from the waste holding tank to forcefully withdraw the waste from the toilet bowl. The drive mechanism is provided with means for disconnecting power to a motor 22 in the drive mechanism in the event that the flexible drain section is obstructed and the drive mechanism is unable to move the pinch mechanism to the position completely closing the flexible drain section.

As illustrated schematically in FIG. 1, the flush valve 10 is shown connected to the drain line 12 of a vacuum flush toilet system suitable for use in various modes of transporation, for example, aircraft. The system includes a toilet control module 24, and the toilet bowl 14 connected by the drain line to the waste holding tank 16. The toilet bowl is located in the pressurized passenger cabin of the aircraft. The waste holding tank preferably is situated below the passenger cabin floor of the aircraft and at a location that permits access to the tank for servicing and emptying after each flight, or as required. The tank also is vented through a vent line 26 to the outside surface 28 of the aircraft. Thus, at sufficiently high altitudes, the difference in pressure between the atmospheric pressure outside the aircraft where the tank is vented, and the cabin pressure inside the aircraft where the toilet bowl is located, creates a vacuum causing air to flow in a direction from the bowl to the tank. At altitudes generally above 15,000 feet, the pressure differential normally is great enough to forcefully withdraw the contents from the bowl, through the drain line and into the tank. At ground level and at altitudes generally below 15,000 feet, a vacuum pump 30 in the vent line may be used to artificially create or supplement the vacuum in the tank sufficient to withdraw the waste. When the vacuum pump is used, a check valve 32 is provided in the vent line to prevent loss of vacuum.

Rinse water for the toilet bowl 14 is provided from a potable water supply tank 34 of the aircraft through a water supply line 36. Passage of rinse water from the potable water tank is controlled by a solenoid valve 38 in the water line. As the rinse water passes through the water supply line, it goes through a vacuum breaker 40 and reaches the bowl where it is directed through a spray manifold 42 in the upper portion of the bowl and ejected through a plurality of spray nozzles 44 spaced apart on the spray manifold. In the preferred embodiment, the spray nozzles are oriented at an angle with respect to the spray manifold and the sides of the bowl so that the water emitted from the spray nozzle swirls around the sides of the bowl and removes any waste or other matter in the bowl. During a flush cycle, the rinse water and waste are forcefully drawn through the drain line 12 and into the waste holding tank 16.

Sequencing of the flush cycle is controlled by the toilet control module 24, which is activated by a flush switch 46 depressed by an occupant. The toilet control module sends a first signal for operating a vacuum blower control module 48 to ensure that sufficient vacuum exists in the tank 16. If the altitude is below approximately 15,000 feet, the vacuum pump 30 is operated to bring the vacuum up to an acceptable level. A second signal also is sent to the solenoid valve 38 for causing a volume of water to pass from the water supply line 32 and through the vacuum breaker 40 into the bowl 14. Another signal simultaneously is sent to the flush valve 10 for opening the flush valve for a predetermined period and evacuating waste and rinse water from the bowl. After the flush valve closes, the toilet control module sends another signal to the vacuum blower control module for shutting off the vacuum pump. The toilet is then ready for the next flushing cycle.

In the vacuum flush toilet described above, it is necessary to maintain the drain line 12 connecting the toilet bowl 14 to the waste holding tank 16 in a normally closed position, except during the relatively brief period when the toilet is engaged in a waste flushing cycle. If the drain line were not kept in a closed position, the vacuum in the tank constantly would be withdrawing air from the cabin of the aircraft, eventually causing an unacceptable reduction of cabin pressure. In accordance with the present invention, as described below, the flush valve 10 positively opens the flexible drain section 20 for a brief period to permit vacuum to withdraw the waste and then positively closes the flexible drain section to prevent loss of cabin pressure. At ground level, where loss of cabin pressure is not a concern, the closed valve prevents undesirable fumes in the waste holding tank from migrating through the drain line and entering the unpressurized cabin through the bowl.

As shown best in FIGS. 2–5, the flush valve 10 of this invention is located external to the drain line 12 and comprises a pinch knife assembly 50 surrounding the flexible drain section 20 and the electro-mechanical drive mechanism 18 for moving the pinch knife assembly to open and close the flexible drain section. The flush valve is enclosed within a housing 52 to prevent possible corrosion or damage to the valve.

The pinch knife assembly or pinch mechanism 50 for opening and closing the flexible drain section 20 includes an upper pinch knife 54 positioned on one side of the flexible drain section and a lower pinch knife 56 positioned on an opposite side of the flexible drain section. The lower pinch knife is substantially L-shaped, having a horizontal leg 58 for engaging the flexible drain section and a vertical leg 60 for pivotal connection by a fastener 62 to one end of a pivot arm 64. The horizontal leg of the lower pinch knife extends through a slot 66 in a vertical sidewall 68 of the housing 52 and has guide pins 70 projecting from the horizontal leg on opposite sides of the sidewall for slidably engaging the sidewall and cooperating with it to provide vertical movement of the lower pinch knife relative to the sidewall. The pivot arm 64, having the one end pivotally connected to the vertical leg, also extends through the slot in the housing and is pivotally connected by a pivot pin 72, at about the midpoint of the arm, to a bracket 74 extending inwardly into the housing. The other end of the pivot arm is pivotally connected by a fastener 76 to the upper pinch knife, shown as having a generally triangular configuration, although it may be of another suitable configuration as desired. Through the arrangement of the pinch knife assembly described above, movement of the upper pinch knife 54 towards the flexible drain section 20 simultaneously moves the lower pinch knife 56 towards the flexible drain section, and movement of the upper pinch knife away from the flexible drain section also moves the lower pinch knife away from the flexible drain section. The pinch knife assembly described above for opening and closing the flexible drain section is well known in the art and is disclosed, for example, in U.S. Pat. No. 3,278,153.

The flexible drain section 20 in the preferred embodiment is substantially circular in cross-section and is made of a flexible material, for example, a resilient elastomer such as rubber. The flexible drain section is pinched or nipped shut and pulled apart to an open position by the flush valve 10 of this invention. Thus, the sections 78 and 80 of the drain line 12 on either side of the flexible drain section may be constructed from metal, metal alloys, plastic or other rigid materials. The pinch knife assembly 50 and housing 52 may be constructed from rigid materials, such as metal, metal alloys, hard plastic, or other suitable materials that preferably are resistant to corrosion.

Figure 3:
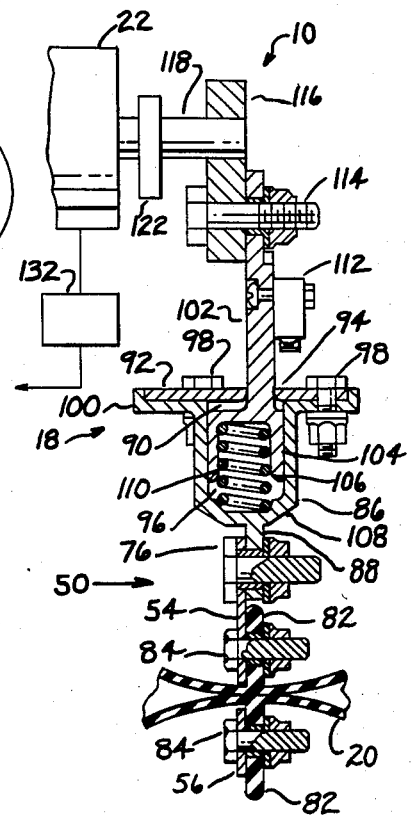
FIG. 3 is a cross-sectional view of the flush valve taken substantially along line 3—3 of FIG. 2.
Figure 5:
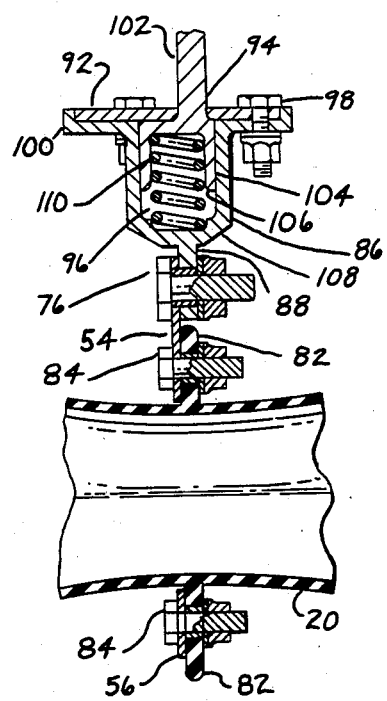
FIG. 5 is a cross-sectional view taken substantially along line 5—5 of FIG. 4.

The upper and lower pinch knives 54 and 56 are rigidly connected to their respective opposed sides of the flexible drain section 20 by attachment to ribs 82 extending radially outwardly on opposite sides of the flexible drain section adjacent to the pinch knives. The ribs are integrally molded as part of the flexible drain section and are secured to the upper and lower pinch knives by fasteners 84 inserted through aligned holes in the ribs and pinch knives, as illustrated in FIGS. 3 and 5. Thus, downward movement of the upper pinch knife 54 by the electro-mechanical drive mechanism 18 positively moves the pinch knives toward each other and closes thhe flexible drain section by pinching or nipping it shut, as shown in FIG. 3, and upward movement of the upper pinch knife positively retracts the pinch knives away from each other and temporarily pulls open the flexible drain section into an opened configuration, as shown in FIG. 5.

Referring again to FIGS. 3 and 5, the electro-mechanical drive mechanism 18 comprises a cylinder 86 having an ear 88 at its lower end for pivotal connection by the fastener 76 to the upper pinch knife 54. The upper end of the cylinder contains an axially upwardly facing opening 90 that is covered by a horizontal cover plate 92 having an offset slot 94 for permitting access to the opening. Together, the cover plate and opening define an enclosure 96 within the cylinder. The cover plate may be secured to the cylinder by a plurality of conventional fasteners 98 inserted through aligned holes in the outer periphery of the cover plate and a shoulder 100 on the cylinder.

A piston 102 is received through the slot 94 and has an enlarged lower end enclosed and slidably retained within the cylinder enclosure 96. The enlarged lower end of the piston has a configuration resembling an inverted casing 104 with a downwardly facing opening 106. The casing preferably is integrally formed with the piston and is capable of reciprocating a limited vertical or axial distance within the enclosure. That is, downward vertical movement of the casing is limited by the bottom wall 108 of the cylinder, and upward vertical movement of the casing is limited by the cover plate 92. A spring 110 is interposed within the enclosure 96 between the cylinder bottom wall and the piston casing to absorb downward piston travel when closing the flexible drain section 20. As explained further below, when the flexible drain section is fully closed or is obstructed and prevented from fully closing, the piston compresses the spring and activates a closed position switch 12 on the piston for deactivating the motor 22 in the drive mechanism 18.

The upper end of the piston 102 is pivotally connected by a fastener 114 to one end of a link 116, with the other end of the link being rigidly attached to the drive shaft 118 of the motor 22. The link may be attached to the drive shaft and the piston in an offset position to provide an adjustable connection between the drive shaft and piston.

Operation of the flush valve 10 is as follows. As shown by the arrow 120 in FIG. 4, rotation of the drive shaft 118 in a first direction moves the piston 102 vertically upward, causing the piston casing 104 to contact the cover plate 92 and pulling the cylinder 86 in the vertically upward direction. This movement, in turn, pulls the upper pinch knife 54 vertically upwardly, retracting the two pinch knives and pulling the flexible drain section 20 to a temporarily open position. When the flexible drain section reaches a fully opened position, a cam 122 mounted on the drive shaft activates an open position switch 124 mounted within the housing 52 on a bracket 126. The open position switch when activated sends a signal to the toilet control module 24 to reverse the direction of the drive shaft 118. This enables rotation of the drive shaft in a second direction opposite the first direction. Thus, as shown by the arrow 128 in FIG. 2, rotation of the drive shaft in the second direction moves the piston vertically downward, causing the piston casing to contact the spring 110 and exert a corresponding downward force upon it and the cylinder. In the preferred embodiment, the spring has a spring force that is greater than the force necessary to nip the flexible drain section shut. Thus, the cylinder will be moved vertically downwardly substantially without compression of the spring as the pinch knives are closing. This movement, in turn, pushes the upper pinch knife vertically downward, moving the two pinch knives towards each other and nipping or pinching the drain to a normally closed position.

Figure 2:
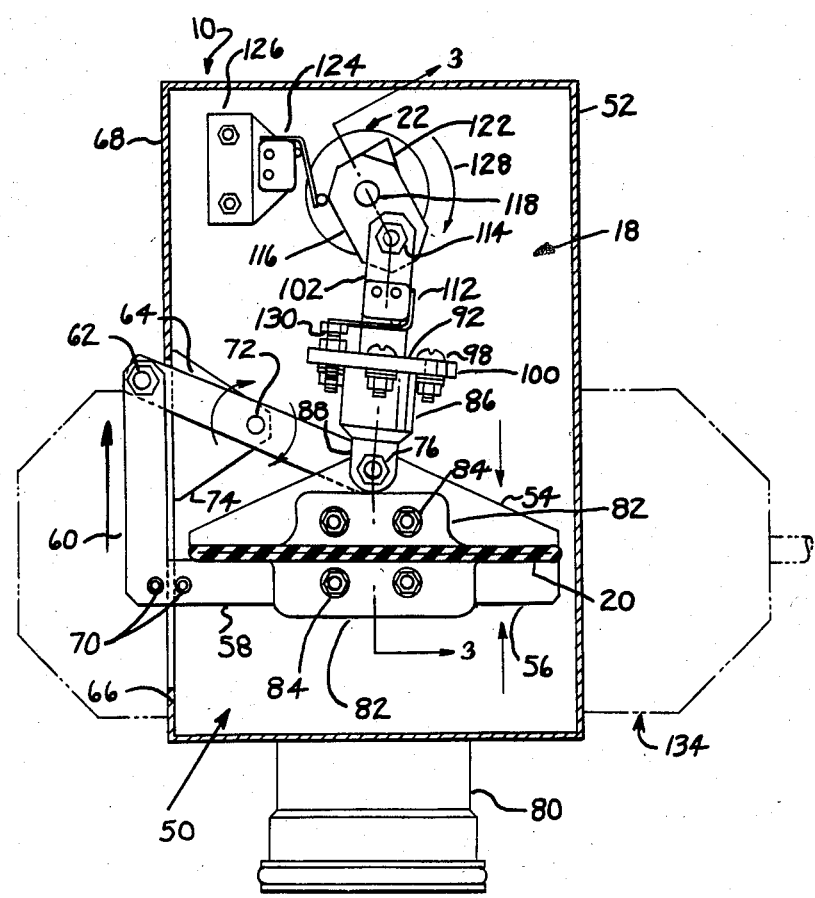
FIG. 2 is a side view of the flush valve, taken substantially along line 2—2 of FIG. 1, showing a flexible section of the drain line in a closed position.
Figure 4:
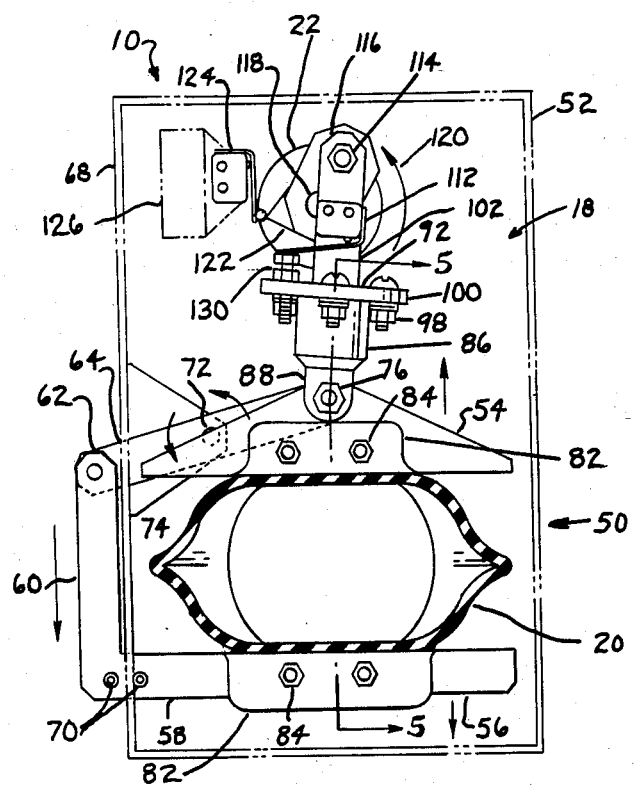
FIG. 4 is a side view of the flush valve, similar to that of FIG. 2, showing the flexible drain section in an open position.

When the flexible drain section 20 finally has been pinched closed, the piston casing 104 continues to apply a vertically downward force to the spring 110 until the piston force overcomes the spring force and compresses the spring. In this way, the spring, piston 102 and cylinder 86 combine to provide a lost motion means within the drive mechanism 18. After the piston has applied a certain amount of closing force to the pinch knife assembly 50 and compressed the spring a predetermined distance, the closed position switch 112 mounted on the piston is activated by movement against a fixed contact 130 on the cylinder to disconnect power to the motor 22. As shown in FIGS. 2 and 4, the contact may comprise an internally threaded, adjustable nut mounted on an externally threaded shank of one of the fasteners 98 securing the cover plate 92 to the cylinder. The adjustable nut can be selectively threaded up or down to adjust the distance which the piston must travel before the closed position switch is activated to disconnect power to the motor. This, of course, adjusts the amount of force exerted by the pinch knives against the flexible drain section.

The components of the drive mechanism 18, such as the cylinder 86, spring 110, piston 102, pivot arm 64 and cam 122 may be constructed from metallic materials or other suitable materials. These materials preferably are light weight and resistant to corrosion.

It will be appreciated that the drive mechanism 18 will be deactivated whenever the downward piston force overcomes the spring force, thus compressing the spring 110 and activating the closed position switch 112 to disconnect power to the motor 22. In the preferred embodiment, the drive mechanism is not disabled until it has exerted a sufficient force so that the flexible drain section 20 is pinched completely closed by the pinch knives 54 and 56. When the flexible drain section is nipped shut, the clamping force of the pinch knives against the flexible drain section provides a substantially tight seal to prevent vacuum in the waste holding tank 16 from withdrawing air from the pressurized cabin. At ground level, the valve further prevents undesirable fumes in the waste holding tank from migrating through the drain line 12 and out of the toilet bowl 14 into the passenger cabin.

The motor 22 for rotating the drive shaft 118 preferably has a motor control 132, shown schematically in FIG. 3, for adjusting the rotational speed of the drive shaft. Thus, the motor speed can be adjusted to open the valve 10 by retracting the pinch knives 54 and 56 at a specified rate that will reduce or eliminate explosive sounds typically created by the vacuum rushing through the drain line 12 upon opening of the valve. Thus, adjustment of the motor speed advantageously reduces the noise level within the lavatory compartment, yet allows substantially immediate evacuation of the waste during flushing. The motor also may be provided with dynamic breaking means in the motor control to counteract motor inertia and enable the drive mechanism 18 to stop in the same position after each flush cycle. If the motor is a D.C. motor, as in the preferred embodiment, the dynamic breaking means may comprise a connector for connecting the positive and negative terminals of the motor to each other in response to a signal received from the closed position switch 112.

Another advantage of the flush valve 10 is that the flexible drain section 20 in the preferred embodiment does not occupy a bend in the drain line 12 connecting the bowl 14 to the tank 16. Thus, if sharp objects are deposited into the bowl, they are more likely to flow through and not rupture the flexible drain section upon rapid acceleration through the drain line by the vacuum.

A further advantage of the flush valve 10 is that the drive mechanism 18 is electro-mechanically operated and, therefore, is totally independent from the vacuum and waste flowing through the drain line 12. Waste, toilet paper and other matter cannot enter internal components of the valve to cause corrosion or failure. Moreover, because the valve is external to the drain line, the valve is easily serviceable and the physical handling of waste is eliminated unless, of course, the drain itself requires servicing.

A still further advantage of the flush valve 10 is that it positively opens the flexible drain section 20 to its maximum extent and permits substantially unobstructed flow of waste through the drain line 12. Because the integral ribs 82 of the flexible drain section are attached to the pinch knives 54 and 56, the ribs are positively pulled apart to open the flexible drain section, and the possibility that the flexible drain section may open only partially is avoided.

In the event that the flush valve 10 or toilet bowl 14 become inoperative for any reason, it may be necessary to isolate the inoperative toilet for servicing, while enabling continued normal operation of other toilets in the system. This may be accomplished by closing the drain line 12 downstream from the flush valve. Accordingly, a manually operated shut-off valve 134 is provided downstream of the flush valve 10, as shown schematically in FIGS. 1 and 2. As further illustrated in FIGS. 6–9, the shut-off valve is shown in a closed and opened position respectively, relative to the drain line.

Figure 6:
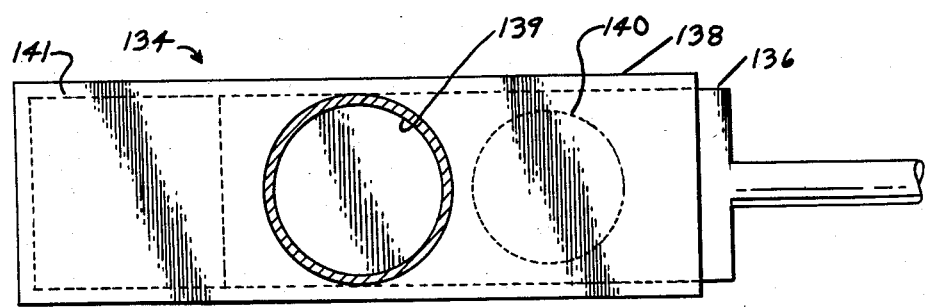
FIG. 6 is a side view of a manually operated shut-off valve showing the drain line in a closed position.
Figure 7:
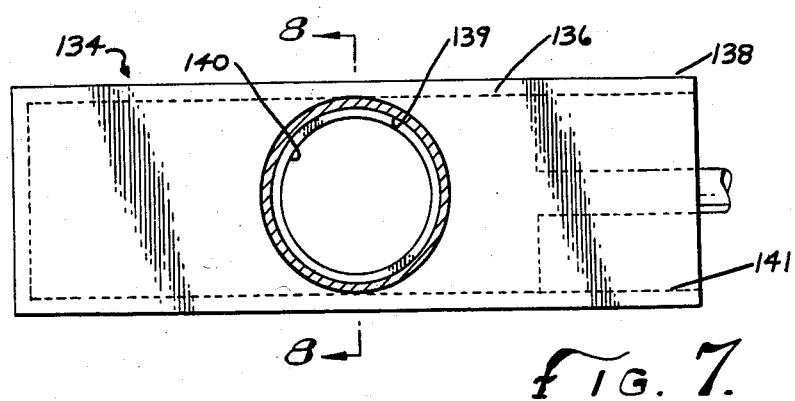
FIG. 7 is a side view of the manual shut-off valve showing the drain in an open position.

The shut-off valve 134 comprises a relatively thin, substantially rectangular shaped plate 136 slidably received within a coupling 138 joining the flexible drain section 20 to the adjacent downstream drain section 80. The coupling and plate each have a circular opening 139 and 140, respectively, substantially corresponding to the circular cross-section of the drain line 12. The coupling opening 139 is positioned in alignment with the drain line to permit flow through the coupling. As explained further below, the plate opening 140 has a diameter slightly less than that of the coupling opening 139. As shown in FIG. 7, movement of the plate into a transverse slot 141 in the coupling allows the plate opening 140 to register with the drain line, thus opening the drain line and permitting vacuum and waste flow through the drain line. This open position typically is the position occupied by the shut-off valve when the flush valve is operating under normal conditions. As shown in FIG. 6, movement of the plate out of the transverse slot causes the plate opening to move out of regisration with the drain line, thus closing the drain line and blocking vacuum and waste flow through the drain line. Means may be provided for moving the plate in and out of the coupling to open and close the drain line, as described above.

Figure 8:
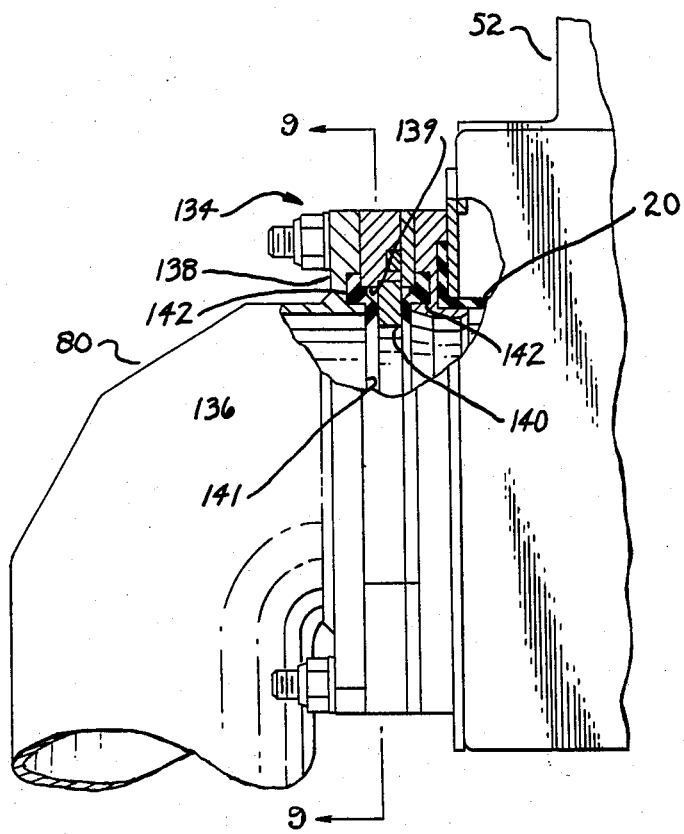
FIG. 8 is a side view, partly in cut-away section, taken substantially along line 8—8 of FIG. 7.
Figure 9:
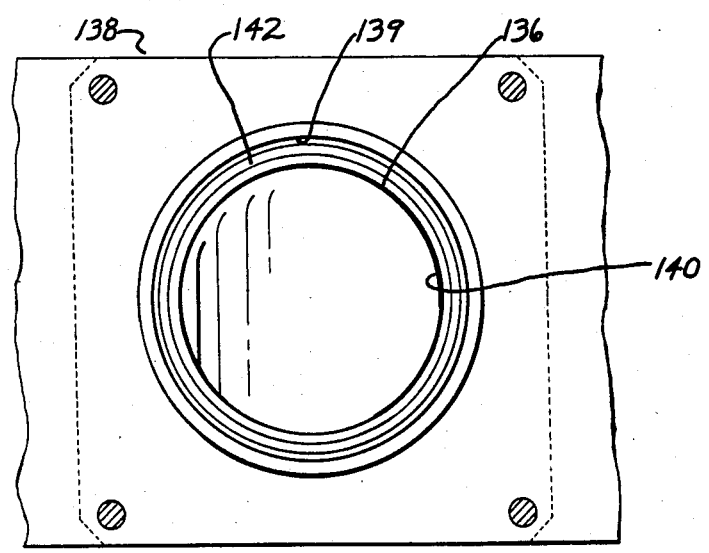
FIG. 9 is a cross-sectional view taken substantially along line 9—9 of FIG. 8.

The coupling 138 further is provided with a pair of gaskets 142 surrounding the opening 139 in the coupling. Since the plate opening 140 has a slighly smaller diameter than the coupling opening, the gaskets each frictionally engage the opposed faces of the plate 136 contiguous to the plate opening to provide a seal between the coupling, the plate and the drain sections as best shown in FIGS. 8-9. This prevents vacuum and waste leakage. The coupling and plate may be constructed from rigid, preferably corrosion resistant materials, such as hard plastic, stainless steel or other suitable materials, while the gaskets may be made from resilient materials, such as rubber or neoprene.

From the foregoing, it will be appreciated that the flush valve 10 of this invention provides positive opening and closing of a flexible section of a drain line connecting a toilet bowl to a waste holding tank under vacuum. The flush valve is entirely external to the drain line, therefore making it easily accessible to service and maintain, and further avoiding undesirable corrosion and possible failure of the valve from the waste. When the flexible drain section is completely closed or is obstructed for some reason, the electro-mechancial drive mechanism 18 automatically is deactivated to prevent stalling of and possible damage to the motor in the mechanism.

While a particular form of the invention has been illustrated and described, it will be apparent that various modifications can be made without departing from the spirit and scope of the invention. Accordingly, it is not intended that the invention be limited, except as by the appended claims.

We claim:

1. A flow control assembly for controlling flow through a drain from a toilet bowl to a waste tank maintained at a partial vacuum, the control assembly comprising:
    (a) a flexible drain section connected in line in the drain;
    (b) a nip mechanism movably connected to said drain section for nipping said flexible drain section shut to stop flow and for dilating said drain section open to enable flow;
    (c) a drive motor having
        an output shaft selectively driven in opposite directions by said drive motor, and
        control means for starting and stopping said drive motor; and
    (d) linkage means connecting said output shaft to said nip mechanism for nipping said flexible drain section shut on shaft motion in one direction and for dilating said flexible drain section open on shaft motion in the opposite direction, said linkage means including
        lost motion means for permitting motion of said output shaft over a limited range of travel without opening or shutting of said nip mechanism,
        resilient biasing means connected with said lost motion means for preventing operation of said lost motion means until said linkage means encounters a predetermined level of force resisting motion of said nip mechanism, said biasing means having sufficient stiffness relative to the force needed to shut said flexible drain section in the absence of an obstruction that said drain section is nipped fully to the shut condition without operation of said lost motion means, application of force beyond that necessary to fully shut said flexible drain section overcoming said biasing means to enable operation of said lost motion means, and
        stop means actuated by said lost motion means and operably connected to said control means for stopping said motor when said linkage means applies a predetermined level of force to said nip mechanism and said lost motion means has travelled a predetermined distance.

2. The flow control assembly of claim 1, wherein said nip mechanism comprises a pinch knife assembly having an upper pinch knife on one side of said flexible drain section and a lower pinch knife on an opposite side of said flexible drain section, the pinch knife being connected together by a pivot arm so that movement of the upper pinch knife in the one direction towards the lower pinch knife nips said flexible drain section shut, and movement of the upper pinch knife in the opposite direction away from the lower pinch knife opens said flexible drain section.

3. The flow control assembly of claim 1, wherein said linkage for connecting said output shaft to said nip mechanism comprises:
    a cylinder having one end connected to said nip mechanism and the other end having an enclosure;
    a piston having one end connected to said output shaft and the other end being retained and reciprocable a limited distance within the enclosure of said cylinder; and
    a spring interposed within the enclosure of said cylinder between said cylinder and the other end of said piston, said spring being in a compressed condition when said flexible drain section is closed,
    motion of the output shaft in the one direction pushing said piston against said spring and said cylinder and moving said nip mechanism to close said flexible drain section, and motion of the output shaft in the opposite direction pulling said cylinder away from the drain and moving said nip mechanism to open said flexible drain section.

4. The flow control assembly of claim 3, wherein said spring has a spring force greater than the force necessary to close said flexible drain section in the absence of an obstruction.

5. The flow control assembly of claim 1, wherein said resilient biasing means is a spring having a spring force that is greater than the force necessary to close said flexible drain section in the absence of an obstruction.

6. The flow control assembly of claim 1, wherein said control means includes means connected to said drive motor for adjusting the rotational speed of said output shaft to enable said nip mechanism to open and close said flexible drain section at different rates.

7. The flow control assembly of claim 1, wherein said drive motor is a D.C. motor and said control means includes means for connecting the positive and negative terminals of said drive motor to provide dynamic breaking to counteract motor inertia when said stop means stops said drive motor.

8. A toilet valve assembly for controlling the flow of waste from a toilet bowl to a waste holding tank through a drain, comprising:
 (a) a flexible drain section in line in the drain;
 (b) a pinch mechanism for movement in a first direction by an actuating force to dilate said flexible drain section to an open position for enabling the flow of waste through the drain, and for movement in a second direction by the actuating force to pinch said flexible drain section to a closed position for stopping the flow of waste through the drain;
 (c) an actuator for applying the actuating force in the first and second direction to said pinch mechanism, said actuator having
  a drive motor connected to a source of power,
  an output shaft connected to said drive motor selectively driven in the first and second directions,
  a first member connected to said output shaft,
  a second member connected to said pinch mechanism, and
  a resilient member interposed between said first member and said second member; and
 (d) switch means actuated by movement of said first member relative to said second member and operably connected to said actuator for connecting and disconnecting power to said motor, said switch means disconnecting power to said motor after said actuator has applied a predetermined level of force to said pinch mechanism and the resilient member has been compressed a pre-determined amount.

9. A flush valve for opening and closing a drain connecting a toilet bowl to a waste holding tank, comprising:
 (a) a pinch knife assembly having an upper pinch knife on one side of the drain and a lower pinch knive on an opposite side of the drain, the pinch knives being connected by a linkage so that movement of the upper pinch knife away from the lower pinch knife opens the drain, and movement of the upper pinch knife towards the loewr pinch knife closes the drain;
 (b) a first member having an upper end with an enclosure and a lower end connected to said pinch knife assembly for movement with the upper pinch knife;
 (c) a second member having a lower end retained within the enclosure, said second member being moveable a limited distance with respect to said first member;
 (d) a resilient member within the enclosure of said first member and positioned between the lower end of said second member and said first member;
 (e) reciprocating means connected to an upper end of said second member for reciprocating said second member in opposite directions, movement of said second member in a first direction pulling said second member, said first member and the upper pinch knife to open the drain, movement of said second member in a second opposite direction pushing said second member against said resilient member, said first member and the upper pinch knife to close the drain; and
 (f) switch means for actuating and disabling said reciprocating means in response to movement of said second member, said switch means being actuated to disable said reciprocating means by movement of said second member relative to said first member and by application of force to compress said resilient member a predetermined amount.

* * * * *